United States Patent [19]

Elgner

[11] 4,320,084

[45] Mar. 16, 1982

[54] AIR CONDUITS AND PROCESS THEREFOR

[75] Inventor: Claude F. Elgner, Toronto, Canada

[73] Assignee: Salga Associates Limited & Company, Southfield, Mich.

[21] Appl. No.: 752,109

[22] Filed: Dec. 20, 1976

Related U.S. Application Data

[63] Continuation-in-part of Ser. No. 575,587, May 8, 1975, abandoned.

[30] Foreign Application Priority Data

Jun. 9, 1976 [CA] Canada ................................ 254389

[51] Int. Cl.$^3$ ............................................. B29C 17/07
[52] U.S. Cl. ................................... 264/540; 264/506; 525/95
[58] Field of Search ............ 260/876 B, 878 B, 880 B; 264/94, 540

[56] References Cited

U.S. PATENT DOCUMENTS

| | | | |
|---|---|---|---|
| 3,313,319 | 4/1967 | Osborn | 264/94 |
| 3,639,163 | 2/1972 | Bishop | 260/876 B |
| 3,810,957 | 5/1974 | Lunk | 260/880 B |
| 3,823,203 | 7/1974 | De La Mare | 260/880 B |
| 3,917,607 | 11/1975 | Crossland | 260/880 B |
| 4,006,116 | 2/1977 | Dominguez | 260/876 B |

*Primary Examiner*—Paul R. Michl
*Attorney, Agent, or Firm*—Basile, Weintraub & Hanlon

[57] ABSTRACT

Air conduits or ducts, including convoluted or bellows-type ducts, are prepared by molding a resinous mixture consisting essentially of a polypropylene and a polystyrene-polyolefin block copolymer. Inert fillers can be present in the mixture.

5 Claims, No Drawings

AIR CONDUITS AND PROCESS THEREFOR

This application is a continuation in-part application of, now abandoned, copending application U.S. Ser. No. 575,587, filed May 8, 1975 for "AIR CONDUITS AND PROCESS THEREFOR".

BACKGROUND OF THE INVENTION

1. Field of the Invention

The present invention relates to processes and compositions for the manufacture of air, heater and air conditioning ducts. More particularly, the present invention relates to process and compositions for the manufacture of air, heater and air conditioning ducts, including bellows-type or convoluted ducts. The present invention also relates to processes and compositions for the manufacture of vehicle-associated air, heater and air conditioning ducts.

2. Prior Art

Air ducts, such as those used with vehicular heaters, and air conditioning systems are well known. Generally, such ducts or conduits comprise a wire support structure having a cloth or rubberized material secured thereto and enveloping the same. The cost of manufacturing such products is quite expensive with respect not only to materials but with respect to labor also. In order to manufacture the ducts it is necessary first to form the wire structure. Then the enveloping material must be secured thereto. Thus, the prior art has sought means and methods to alleviate this problem. See, inter alia, U.S. Pat. Nos. 3,313,319 and 2,728,356. These patents teach the formation of ducts or conduits from various synthetic products, such as polyethylene, polytrichloroethylene and the like. However, this solution has not been fully successful.

There remains the problem of manufacturing such articles to meet all climatic conditions, both hot and cold weather, while still maintaining their structural integrity. Furthermore, such articles must be able to withstand the force vectors which are created by velocities of air currents, which can also be at elevated temperatures, passing therethrough. It must be appreciated that a major advance in the art would be provided by an air duct of reduced cost and excellent thermal and structural stability.

SUMMARY OF THE INVENTION

In accordance with the present invention an air conduit is prepared by molding a composition consisting essentially of (a) polypropylene and (b) a polystyrene-polyolefin block copolymer, the copolymer consisting essentially of polystyrene end blocks and an ethylene-butylene copolymer rubbery midblock. The present invention also comprises a molding composition comprising a mixture of the polypropylene and the copolymer.

The mixture generally contains from about ten to fifty percent, by weight, of the polypropylene, based on the total weight of the mixture and from about fifty to ninety percent, by weight, of the block copolymer, based on the total weight of the mixture.

The mixture can be blow molded, injection molded or extruded at a temperature ranging from about 325° F. to about 500° F. and at a pressure of about 20,000 pounds per square inch, depending on the type of duct desired.

Conventional fillers such as calcium carbonate, talc, fiberglass, etc., can also be used in admixture with the synthetic resinous mixture.

Air conduits produced hereby exhibit excellent structural and thermal stability.

For a more complete understanding of the present invention reference is made to the following detailed description and accompanying examples.

DESCRIPTION OF THE PREFERRED EMBODIMENTS

As hereinbefore noted the present invention provides air conduits prepared by molding a synthetic resinous mixture consisting essentially of (a) polypropylene and (b) a polystyrene-polyolefin block copolymer.

At the outset it should be noted that the term "molding" as used herein is meant to include injection molding, blow molding and extrusion. It has been found that the blend is amenable to all such forming operations.

The mixture generally contains from about ten to fifty percent, by weight, of the polypropylene based on the total weight of the mixture and from about fifty to ninety percent, by weight, of the block copolymer, based on the total weight of the mixture. Preferably, the block copolymer is present in an amount ranging from about sixty-five to seventy-five percent, by weight, based on the total weight of the mixture.

The polypropylene contemplated for use herein is a solid resin having a specific gravity in the range of 0.90 to 0.91 g/cc. One such product is that sold by Shell Oil Company under the name Shell Polypropylene 5520. Further, this product has a melting point of 330° F. It should be noted with respect hereto that it has been found that only polypropylene will blend with the block copolymer and produce molded objects having the desired properties. Experiments have shown that a blend of polyethylene with the product sold under the trade mark Kraton could not withstand an exposure of 336 hours at 300° F. without showing signs of degradation or embrittlement. An air duct was prepared from the blend and after 48 hours at a temperature of 270° F. the duct collapsed. On the other hand, the blend of the present invention will produce ducts which can withstand exposure of 336 hours at 300° F. without showing signs of degradation or embrittlement.

In order to produce air ducts, as desired, the type of polypropylene described should be adhered to. With respect hereto, it is only necessary that the polypropylene exhibit a melt temperature of from about 310° F. to about 500° F., with the preferred temperature being at least 330° F.

The polystyrene-polyolefin block copolymer contemplated for use herein is a thermoplastic elastomeric-type synthetic rubber. This block copolymer is also a commercially available product and is sold by Shell Chemical Company under the trade mark "KRATON G 7000". This product is generally defined as having polystyrene end blocks and a polyolefinic rubbery midblock. The rubbery midblock of the product is an ethylene-butylene copolymer. Thus the product contemplated for use herein is a three block polystyrene-(polyethylelebutylene)-polystyrene thermoplastic product. An eminently useful type of block copolymer is that sold under the trade mark KRATON GX-7720 which has the following representative physical properties:

|  | ASTM Test |  |
| --- | --- | --- |
| SPECIFIC GRAVITY |  | 1.20 g/cc |
| SHORE A HARDNESS | D-2240 | 62 |
| TENSILE PROPERTIES | D-412 |  |
| $T_B$ (psi) |  | 1000 |
| $E_B$ (%) |  | 600 |
| $M_{100}$ (psi) |  | 350 |
| $M_{300}$ (psi) |  | 400 |
| Tensile Set (%) |  | 25 |
| MODULUS OF ELASTICITY, FLEX (psi) | D-790 | 1600 |

These thermoplastics are both heat and shear stable at temperatures up to about 500° F. It is to be understood that in practicing the present invention any thermoplastic block copolymer of the polystyrene-polyolefinic nature of the type herein described can be used.

In preparing the air ducts or conduits, inert fillers can also be used in admixture with the blend of resins. Representative fillers include, for example, calcium carbonate, asbestos, mica, titanates such as barium titanate, potassium titanate, talc, vermiculite, titanium dioxide, boron nitrides, kaolinite, diatomaceous earths and clays, fiberglass, etc., as well as mixtures thereof. Generally, the filler is employed in an amount ranging from about 0.1%, by weight, to about 20%, by weight, based on the total weight of the mixture. Preferably, the filler is employed in an amount ranging from about one to twenty percent, by weight, based on the total weight of the mixture.

As hereinbefore noted, the air ducts of the present invention are prepared by molding the defined blend. A particularly preferred method is blow molding. Generally as one skilled in the art would appreciate, blow molding is one form of extrusion molding wherein the melt, i.e. the resinous mixture, is exhausted under pressure through an orifice, die and mandrel into a mold or die. In blow molding the blend of the present invention, the process is generally carried out at a temperature ranging from about 325° F. to about 500° F. Preferably the process is carried out at a temperature ranging from about 350° F. to 470° F.

A pressure of about 20,000 psi at the orifice is generally utilized. In blow molding the ducts of the present invention any conventional blow molding extrusion equipment can be employed.

Air ducts produced in accordance herewith exhibit heat or thermal stability over a temperature range of from about −50° F. to about 310° F. and also exhibit no impairment of physical properties over this temperature range. The ducts still remain flexible at ambient conditions.

The air ducts of the present invention are useful as air, air conditioning and heater ducts in vehicles. Furthermore, the present invention is useful in the manufacture of bellows-type or convoluted ducts.

For a more complete understanding of the invention reference is made to the following examples.

EXAMPLE 1

A seven inch flexible bellows-type air duct was prepared from a resinous mixture containing thirty percent by weight of polypropylene[1] and seventy percent by weight of a polystyrene-polyolefin block copolymer[2] by blow molding at a temperature of 400° F. The air duct had a wall thickness of 0.060 inches ±0.020 inches.

The air duct was mounted in a 90° position in a draft oven maintained at 310° F. for twenty-four hours. The duct exhibited no effect from the exposure.

The duct was then mounted in a 90° position and exposed to temperatures of −50° F. for a period of twenty-four hours. The duct was then subjected to a drop test. At three foot-pounds the duct showed no effect from the drop test.

(1) Shell Polypropylene 5220
(2) Shell KRATON GX-7720

EXAMPLE 2

A duct similar to that described in Example 1 was prepared by blow molding at 400° F. a composition containing twenty-six percent, by weight, of polypropylene[1], seventy percent, by weight, of a polystyrene-polyolefin block copolymer[2] and four percent, by weight, of calcium carbonate.

The duct was subjected to the same testing hereinbefore described. The duct exhibited no impairment of physical properties when subjected to heat or cold.

The embodiments of the invention in which an exclusive property or privilege is claimed are defined as follows:

1. In a process for the manufacture of an air duct for transporting hot and cold air from a source thereof, the improvement which comprises: molding a composition comprising (a) polypropylene and (b) a polystyrene-polyolefin block copolymer, the copolymer consisting essentially of polystyrene end blocks and an ethylene-butylene copolymer rubbery mid-block, and in which the poly-propylene is present in the composition in an amount ranging from about ten to about fifty percent by weight, based on the total weight and the block copolymer is present in an amount ranging from about fifty to about ninety percent by weight, based on the total weight.

2. The process as claimed in claim 1 wherein the molding is carried out at a temperature ranging from about 330° F. to about 500° F.

3. The process as claimed in claim 1 wherein the composition includes from about 0.1 to about 20 percent by weight of inert filler.

4. The process as claimed in claim 1 in which the composition is blow molded.

5. In a process for the manufacture of a bellows-type vehicular air conditioning and heating duct, the improvement which comprises:
   molding a composition consisting essentially of:
   (a) from about ten to fifty percent, by weight, based on the total weight, of a polypropylene having a melting point of at least 330° F., and
   (b) from about fifty to ninety percent, by weight, based on the total weight, of a polystyrene-polyolefinblock copolymer consisting essentially of polystyrene end blocks and an ethylene-butylene copolymer rubbery midblock.

\* \* \* \* \*